US 11,781,580 B2

(12) United States Patent
Horst et al.

(10) Patent No.: US 11,781,580 B2
(45) Date of Patent: Oct. 10, 2023

(54) METHOD AND APPARATUS FOR APPLYING A CORROSION-RESISTANT COATING TO FASTENERS

(71) Applicant: Illinois Tool Works Inc., Glenview, IL (US)

(72) Inventors: Christopher A. Horst, Antioch, IL (US); Donald E. Bergstrom, Lindenhurst, IL (US); Johnny Bertelsen, Middelfart (DK); Signe Tolberg Andersen, Aarup (DK); Flemming Sørensen, Vojens (DK)

(73) Assignee: Illinois Tool Works Inc., Glenview, IL (US)

( * ) Notice: Subject to any disclaimer, the term of this patent is extended or adjusted under 35 U.S.C. 154(b) by 684 days.

(21) Appl. No.: 16/896,344

(22) Filed: Jun. 9, 2020

(65) Prior Publication Data

US 2020/0300285 A1 Sep. 24, 2020

Related U.S. Application Data

(62) Division of application No. 15/649,153, filed on Jul. 13, 2017, now Pat. No. 10,690,166.
(Continued)

(51) Int. Cl.
*C23C 4/02* (2006.01)
*F16B 15/00* (2006.01)
(Continued)

(52) U.S. Cl.
CPC ...... *F16B 15/0092* (2013.01); *B05B 13/0242* (2013.01); *B05C 5/0208* (2013.01);
(Continued)

(58) Field of Classification Search
None
See application file for complete search history.

(56) References Cited

U.S. PATENT DOCUMENTS 1,829,974 A 11/1931 Williams
3,267,660 A 8/1966 Matthews
(Continued)

FOREIGN PATENT DOCUMENTS

EP 0727266 A1 8/1996
EP 1493930 A2 1/2005
(Continued)

OTHER PUBLICATIONS

"International Search Report and Written Opinion", International Application No. PCT/US2017/042764 (15 pages), dated Oct. 13, 2017.

*Primary Examiner* — Shamim Ahmed
*Assistant Examiner* — Bradford M Gates
(74) *Attorney, Agent, or Firm* — Neal, Gerber & Eisenberg LLP

(57) ABSTRACT

A method of applying a corrosion-resistant coating to a fastener that includes preheating an area of the fastener to be coated to elevate a temperature of the area and spraying the preheated area of the fastener with a molten or semi-molten metal. In one embodiment, a corrosion-resistant coating applicator includes a support structure, a rotatable slotted fastener conveyer supported by the support structure, a feeder configured to feed fasteners to the rotatable slotted fastener conveyer, a fastener aligner configured to make head portions of the fasteners aligned with each other, a heater configured to heat head portions of the fasteners as the fasteners are being conveyed by the slotted fastener conveyer, and a sprayer configured to apply a corrosion-resistant coating to the heated head portions of the fasteners being conveyed by the slotted fastener conveyer. The present
(Continued)

US 11,781,580 B2

Page 2 disclosure also provides corrosion-resistant coated fasteners made using the coating methods and/or coating apparatus.

21 Claims, 11 Drawing Sheets

Related U.S. Application Data

(60) Provisional application No. 62/367,978, filed on Jul. 28, 2016.

(51) Int. Cl.

| | | |
|---|---|---|
| C23C 4/18 | (2006.01) |
| B21G 5/00 | (2006.01) |
| C23C 4/131 | (2016.01) |
| C23C 2/06 | (2006.01) |
| C23C 2/26 | (2006.01) |
| C25D 5/48 | (2006.01) |
| C25D 7/06 | (2006.01) |
| B21G 3/00 | (2006.01) |
| B05B 13/02 | (2006.01) |
| B05C 11/06 | (2006.01) |
| B05C 5/02 | (2006.01) |
| B05C 9/14 | (2006.01) |
| F16B 33/00 | (2006.01) |
| C23C 2/04 | (2006.01) |
| C23C 4/08 | (2016.01) |
| C23C 4/12 | (2016.01) |
| C25D 3/22 | (2006.01) |
| C25D 7/00 | (2006.01) |
| B05B 7/22 | (2006.01) |

(52) U.S. Cl.
CPC ............... *B05C 9/14* (2013.01); *B05C 11/06* (2013.01); *B21G 3/00* (2013.01); *B21G 5/00* (2013.01); *C23C 2/04* (2013.01); *C23C 2/06* (2013.01); *C23C 2/26* (2013.01); *C23C 4/02* (2013.01); *C23C 4/08* (2013.01); *C23C 4/12* (2013.01); *C23C 4/131* (2016.01); *C23C 4/18* (2013.01); *C25D 3/22* (2013.01); *C25D 5/48* (2013.01); *C25D 7/00* (2013.01); *C25D 7/0607* (2013.01); *F16B 33/008* (2013.01); *B05B 7/224* (2013.01)

(56) References Cited

U.S. PATENT DOCUMENTS

| | | | |
|---|---|---|---|
| 3,818,525 A | * | 6/1974 | Bedi ................. B24C 11/00 |
| | | | 411/257 |
| 4,155,327 A | | 5/1979 | Alexander et al. |
| 4,802,807 A | | 2/1989 | Offenburger et al. |
| 4,964,774 A | | 10/1990 | Lat et al. |
| 5,033,181 A | | 7/1991 | Lat et al. |
| 5,564,876 A | | 10/1996 | Lat |
| 5,655,969 A | | 8/1997 | Lat |
| 5,749,692 A | | 5/1998 | Kish et al. |
| 7,273,337 B2 | | 9/2007 | Lat et al. |
| 7,553,554 B2 | | 6/2009 | Miller et al. |
| 7,641,432 B2 | | 1/2010 | Lat et al. |
| 7,788,787 B2 | | 9/2010 | Shelton et al. |
| 8,033,005 B1 | | 10/2011 | Heskel et al. |
| 8,251,686 B1 | | 8/2012 | Heskel et al. |
| 8,333,538 B2 | | 12/2012 | Shelton et al. |
| 8,353,658 B2 | | 1/2013 | Heskel et al. |
| 8,360,703 B2 | | 1/2013 | Shelton et al. |
| 8,650,740 B2 | | 2/2014 | Heskel et al. |
| 2005/0232723 A1 | | 10/2005 | Dalidowitz et al. |
| 2013/0195580 A1 | | 8/2013 | Kast et al. |

FOREIGN PATENT DOCUMENTS

| | | |
|---|---|---|
| GB | 2313311 A | 11/1997 |
| WO | 9105613 A1 | 5/1991 |
| WO | 9510364 A1 | 4/1995 |

\* cited by examiner

METHOD AND APPARATUS FOR APPLYING A CORROSION-RESISTANT COATING TO FASTENERS

PRIORITY CLAIM

This patent application is a divisional of, claims priority to and the benefit of U.S. Non-Provisional patent application Ser. No. 15/649,153, filed Jul. 13, 2017, which claims priority to and the benefit of U.S. Provisional Patent Application No. 62/367,978, filed Jul. 28, 2016, the entire contents of both of which are incorporated herein by reference.

BACKGROUND

Steel nails often rust when exposed to the elements. To prevent this, corrosion-resistant finishes are typically utilized to protect the nails. One such method of incorporating corrosion protection is to manufacture nails from steel wire that is pre-plated with zinc to provide galvanic protection.

One problem with such method relates to the protection of the head or head portion of the nail. More specifically, the head portion of the nail is typically formed by deforming the steel wire. When the head portion of the nail is formed, the zinc plating on the steel wire is also deformed and often results in uneven distribution of zinc across the entire nail head portion. While the resulting zinc layer still provides certain amounts of galvanic corrosion protection, especially during the harsh conditions of exposure to moisture, the head portion of the nail thus often experiences at least some cosmetic corrosion over time at one or more of the locations on the head portion where the zinc is thinner or non-existent. This corrosion typically occurs in relatively milder dry conditions, where galvanic protection is only provided to areas covered with zinc. Improving the uniformity and continuity of the zinc layer on the nail head portion is highly desirable to improve corrosion resistance in all conditions.

Another problem relates to conventional methods used to entirely coat steel nails with heavy levels of zinc that require immersion of the nails in molten zinc at temperatures of 800 degrees to 1100 degrees Fahrenheit (which is sometimes referred to as "hot-dip galvanizing"). Such hot-dip galvanizing has various processing issues. First, hot-dip galvanizing is a batch process that can introduce variation from batch to batch. Second, adding a batch process in the middle of manufacturing a product can add to operational complexity, inefficiency, and expense. This process is also especially cumbersome when nails will be subsequently processed to be aligned and collated for use in automatic nail-driving tools. For instance, untreated nails are removed from the manufacturing line, hot-dip galvanized in a batch, and then the treated nails are reintroduced into the manufacturing line. The inventory of untreated nails and treated nails must be managed carefully not to cause delays in the manufacturing process. For example, if the inventory of treated nails is exhausted before the next batch of untreated nails finishes the hot-dip galvanizing batch process, the manufacturing process will be delayed. Third, handling the nails during hot-dip galvanizing typically heats the nails to a level that can cause the heated nails to become weakened and bend. Bent nails increase waste in the post-galvanizing processes and in many instances cannot be sold and need to be discarded. This increases waste and also increases cost. Fourth, the quality of the galvanized layer must be inspected for each batch that is processed. Variations from batch to batch can result in subsequent manufacturing difficulties and inconsistent quality of corrosion protection that is provided.

A known improved method versus this conventional hot-dip galvanizing process is to manufacture hot-dip galvanized wire and then cut and form the nails from that wire. There are advantages to this method. First, the wire galvanizing processes result in substantially smoother and more uniform zinc plating layers than the batch-galvanized nails. Nails made from such wire are substantially more uniform in dimension, and improvements in manufacturing efficiency and reductions in scrap are realized when nails are aligned and collated for use in automatic nail-driving tools. Second, galvanization of wire is typically a continuous process, which enables much larger quantities of steel to be galvanized in a batch than pre-formed nails. This greatly reduces the amount of inspection that must be performed to ensure that the zinc plating on the nails meets manufacturing and corrosion protection requirements.

However, a disadvantage to the manufacturing of nails from galvanized wire is that coverage of the zinc plating may not extend across the entirety of the formed nail head or head section. When the galvanized wire is cut and the head portion is stamped, the zinc plating on or around the head portion is disrupted. The zinc tends to be malleable and can flow in the same manner as the underlying steel to form the head; however, continuity is compromised and areas with little or no zinc can result on the top of the nail head surface. Practically, relatively enough corrosion resistance is maintained across and around the nail head surfaces due to the overall presence of zinc. Typical harsh environmental conditions that necessitate corrosion resistance in application include rain and condensation. Wet environmental factors enable the zinc to provide broad galvanic protection across the entire nail head surface when it is wet, almost regardless of the uniformity or continuity of the zinc layer. While drier conditions are not considered to be as corrosive to metals, drier environmental conditions do not permit zinc to have as much "throwing power", which enables exposed steel on the nail heads to oxidize locally and create superficial rust. Cosmetically, this is undesirable. The known solution to remedy this cosmetic issue is to apply an anti-corrosion paint on the nail head surface. This solution is not satisfactory because it provides a mixed barrier or mixed galvanic method of protection that is not the same as the rest of the nail.

Accordingly, there is a need to provide a new method and apparatus for applying a more consistent corrosion-resistant coating to fasteners (such as nails) that solve these problems. There is a need to provide new fasteners (such as nails) that solve these problems.

SUMMARY

Various embodiments of the present disclosure provide a method and corrosion-resistant coating applicator and finished fastener that solve the above problems.

In various embodiments, the present disclosure provides a method of applying a corrosion-resistant coating to a fastener suitable for use within a power driving tool. The method generally includes preheating an area of the fastener to be coated (such as the head of the fastener) to elevate a temperature of the area to be coated, and spraying the preheated area of the fastener with a molten or semi-molten metal. The sprayed metal provides a sacrificial cathodic corrosion protection to the heated area of the fastener. In various embodiments, the sprayed metal is selected from the group consisting of at least one of the following: zinc, aluminum, and alloys thereof. In various embodiments, the fastener is made from a wire with a cathodic protection metal coating. In various embodiments, the cathodic protection metal coating is a hot-dip galvanization. In various embodiments, the cathodic protection metal coating is an electroplated coating. In various embodiments, the metal spray is of substantially the same metal or alloy of the cathodic protection metal coating.

In various embodiments, the present disclosure also provides a corrosion-resistant coating applicator that generally includes a support structure, a rotatable slotted fastener conveyer supported by the support structure, a feeder configured to feed fasteners to the rotatable slotted fastener conveyer, a fastener aligner configured to align head portions of the fasteners with each other, a heater configured to heat head portions of the fasteners as the fasteners are being conveyed by the slotted fastener conveyer, and a sprayer configured to apply corrosion-resistant coating to the heated head portions of the fasteners being conveyed by the slotted fastener conveyer.

In various embodiments, the present disclosure also provides corrosion-resistant coated fasteners (such as nails) made using the coating methods and/or coating apparatus described herein.

The present disclosure solves the above problems by applying metal to complete the continuity of zinc on the fastener surfaces, and thus overcomes the lack of a continuous zinc coating over the entire nail head surface, which can cause the rust appearance issue.

In various embodiments of the present disclosure, the corrosion-resistant coating applicator applies a layer of pure metal such as zinc to the heads of the fasteners to prevent cosmetic erosion.

In various embodiments of the present disclosure, the metal sprayed-on coating meets or attaches to the heated areas of the fastener such as the head of the fastener without diffusing into that heated area. One advantage of coating the head of the fastener without diffusing into this area such as the head of the fastener is that the heated area such as the head of the fastener does not have to be heated to a diffusion enabling temperature (i.e., a temperature where the head is at or close to its melting point) that can weaken or substantially weaken the fastener, and that can cause the head of the fastener to remain weakened after cooling, and in some instances to be slightly bent or misaligned (i.e., not straight). An advantage of the present disclosure is that it provides a method of applying a metal coating on the head with a thickness otherwise only practically attainable through batch hot-dip galvanizing, without the drawback of potentially weakening the fastener and its head from exposure to high temperatures.

Various embodiments of the present disclosure provide a bead blaster apparatus configured to work with the corrosion-resistant coating applicator of the present disclosure. Various embodiments of the present disclosure also provide a method of abrading the head portions of the fasteners before applying the corrosion-resistant coating to the head portions of the fasteners. In various such embodiments, atomized grit media is directed toward the head portions of the fasteners as the fasteners are moved by a fastener conveyer such that the atomized grit media will be directed at each head portion of each fastener multiple times. Various embodiments of the present disclosure also provide a fastener with a head portion abraded one or more times and coated with a corrosion-resistant coating.

Various embodiments of the present disclosure include applying a sealer on the corrosion-resistant coating on the head portions of the fasteners. Various embodiments of the present disclosure further include applying a top coat on the sealer on the corrosion-resistant coating on the head portions of the fasteners.

Other objects, features, and advantages of the present disclosure will be apparent from the following detailed disclosure, taken in conjunction with the accompanying sheets of drawings, wherein like reference numerals refer to like parts.

DETAILED DESCRIPTION

Figure 1:
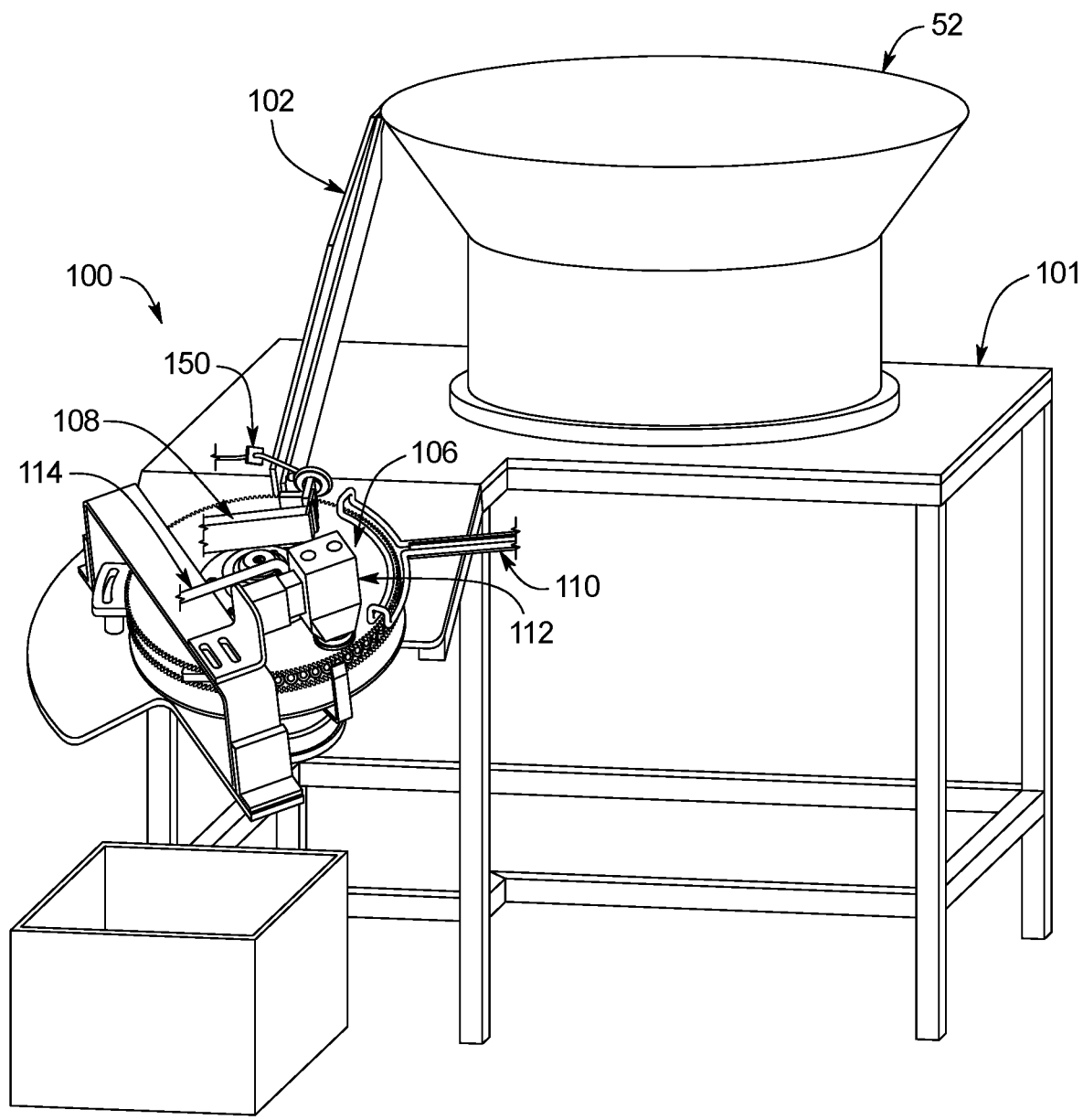
FIG. 1 is a side perspective view of a corrosion-resistant coating applicator of one example embodiment of the present disclosure.

Referring now to the drawings and particularly to FIGS. 1, 2, 3, 4, 5 and 6, the corrosion-resistant coating applicator of one example embodiment of the present disclosure is generally illustrated and indicated by numeral 100. The corrosion-resistant coating applicator is also referred to herein as an applicator for brevity. Such abbreviation is not meant to limit the present disclosure in any manner. The applicator 100 generally includes: (a) a supporting structure 101; (b) a feeder 102 configured to feed fasteners 50 to a rotatable slotted fastener conveyer 106 that is configured to convey the fasteners 50; (c) a fastener aligner 108 configured to make the head portions of the fasteners 50 generally flush, aligned or level with one another; (d) a heater 110 configured to heat the head portions of the fasteners 50 as the fasteners 50 are being conveyed by the slotted fastener conveyer 106; (e) a spray assembly 112 configured to apply a corrosion-resistant coating to the heated head portions of the fasteners 50 being conveyed by the slotted fastener conveyer 106; and (f) a first blower 114 that discards excess portions of the corrosion-resistant coating. In the illustrated example embodiment, the fasteners 50 are nails (such as framing nails, finish nails, screws, rivets, bolts, etc.).

Figure 2:
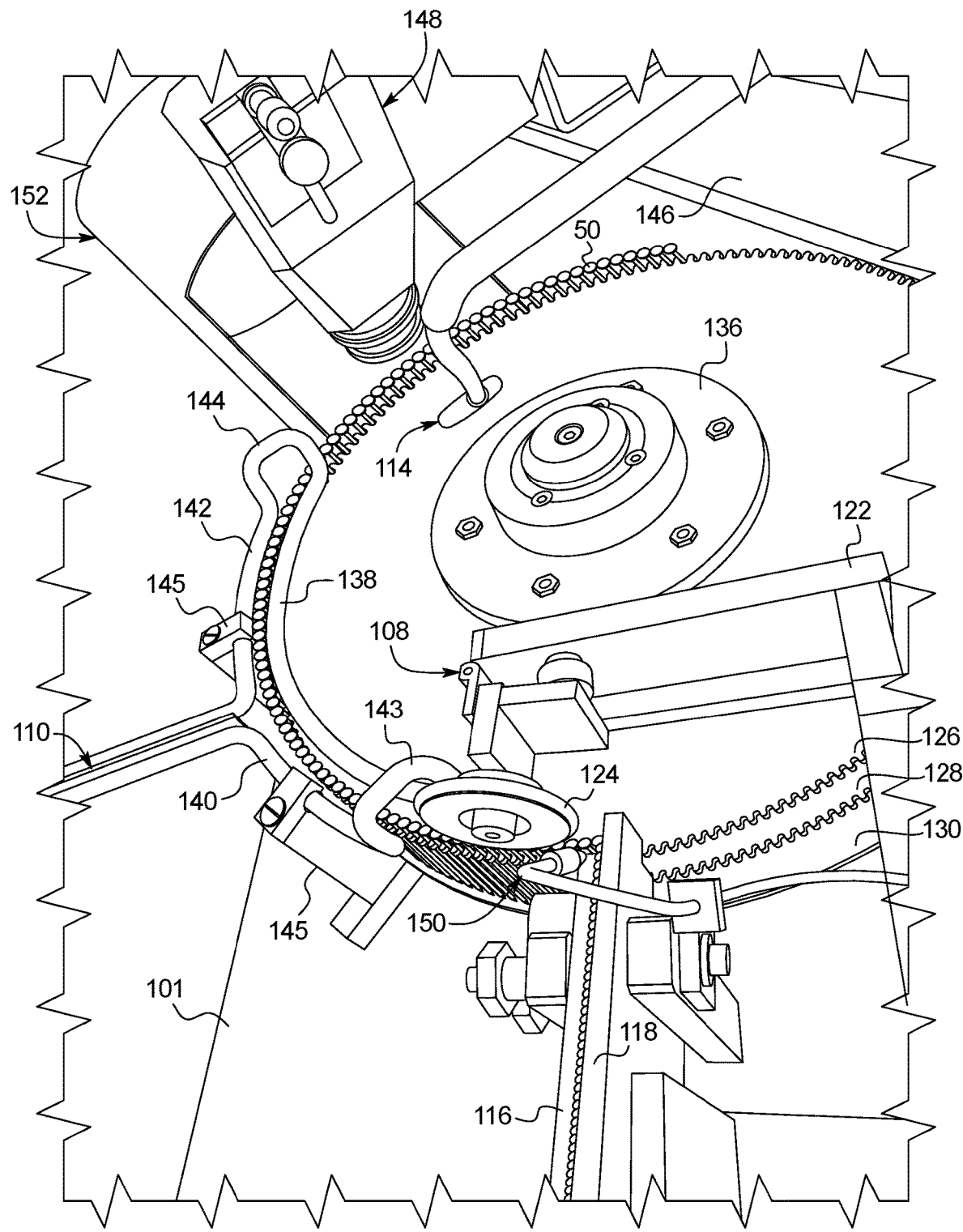
FIG. 2 is a top fragmentary perspective view of the corrosion-resistant coating applicator of one example embodiment of the present disclosure.
Figure 3:
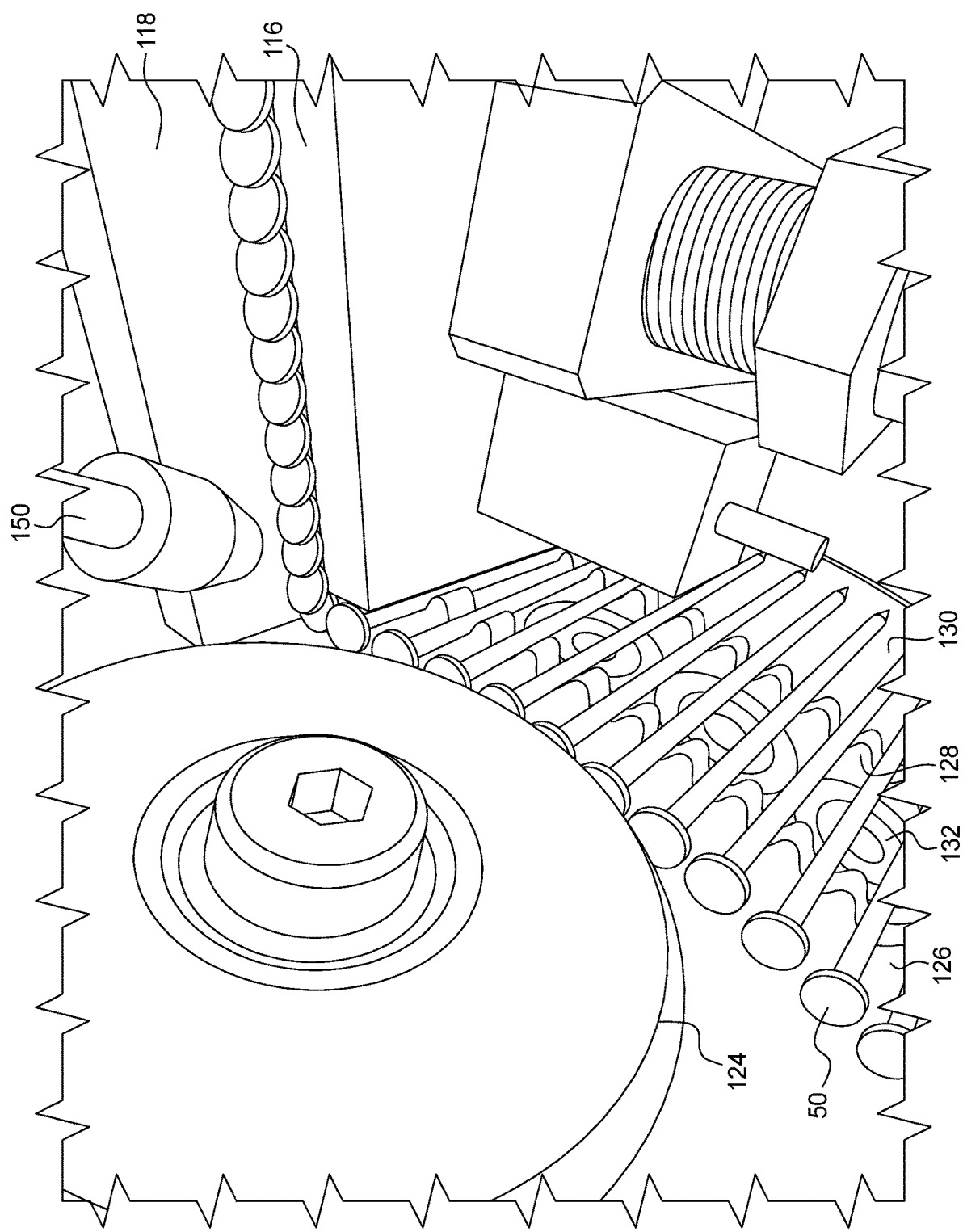
FIG. 3 is an enlarged fragmentary perspective view of a feeder, a rotatable slotted fastener conveyer, and a fastener aligner of the corrosion-resistant coating applicator of FIG. 2.

More specifically, the feeder 102 in this illustrated example embodiment includes: (a) a first downwardly extending guide plate 116; (b) a second downwardly extending guide plate 118 aligned with the first guide plate 116; and (c) guide rollers (not shown). The feeder 102 is supported by the suitable supporting structure 101 in this illustrated embodiment, but can be alternatively supported by another supporting structure. The first downwardly extending guide plate 116 and the second downwardly extending guide plate 118 define a gap there between that: (i) facilitates shank portions of the fasteners 50 fitting between the first downwardly extending guide plate 116 and the second guide plate 118; (ii) enables the feeder 102 to convey the fasteners 50 in a single row; and (iii) prevents the head portions of the fasteners 50 from fitting between the first downwardly extending guide plate 116 and the second downwardly extending guide plate 118 (as best shown in FIGS. 2 and 3). The first downwardly extending guide plate 116 and the second downwardly extending guide plate 118 have or define cutouts that enable the guide rollers to contact the shank portions of the fasteners 50. The guide rollers are configured to rotate in such a manner to convey the fasteners 50 from a suitable feeding mechanism (such as example bowl feeder 52 shown in FIG. 1) to the rotatable slotted fastener conveyer 106. For example, one of the guide rollers may rotate in a clockwise direction and the other one of the guide rollers may rotate in a counter-clockwise direction. When the guide rollers contact one of the fasteners 50, that fastener 50 is pushed forward towards the rotatable slotted fastener conveyer 106 and pushes against the fastener 50 in front of it (i.e., the downstream fastener).

The fastener aligner 108 in this illustrated example embodiment includes: (a) a positioning arm 122 supported by the supporting structure 101; and (b) an aligner 124. The fastener aligner 108 is supported by the supporting structure 101 in this illustrated embodiment, but can be alternatively supported by another suitable supporting structure. The positioning arm 122 is configured to position the aligner 124 to be in contact with the tops or top surfaces of the head portions of the fasteners 50 after the fasteners 50 exit the feeder 102 and are positioned on the rotatable slotted fastener conveyer 106 (as best shown in FIGS. 2 and 3). The aligner 124 exerts downward forces on the fasteners 50 to make the head portions of the fasteners 50 aligned, level, or flush with each other. In this illustrated example embodiment, the aligner 124 does not exert transverse forces on head portions of the fasteners 50 so that the aligner 124 does not interfere with the rotation of the rotatable slotted fastener conveyer 106. In this illustrated example embodiment, the aligner 124 includes a roller that rolls as the fasteners pass underneath. In other embodiments, the aligner 124 may be any other suitable device configured to exert the downward forces on the fasteners 50 after they are positioned on the rotatable slotted fastener conveyer 106.

The rotatable slotted fastener conveyer 106 in this illustrated example embodiment includes: (a) a first rotatable slotted plate 126; (b) a second rotatable slotted plate 128 aligned with the first rotatable slotted plate 126; (c) a rotatable base plate 130 aligned with the first rotatable slotted plate 126; (d) magnets 132; (e) a wedge 134; (f) a central hub 136, and (g) a driving assembly (not shown). The rotatable slotted fastener conveyer 106 is supported by the supporting structure 101 in this example embodiment.

Figure 6:
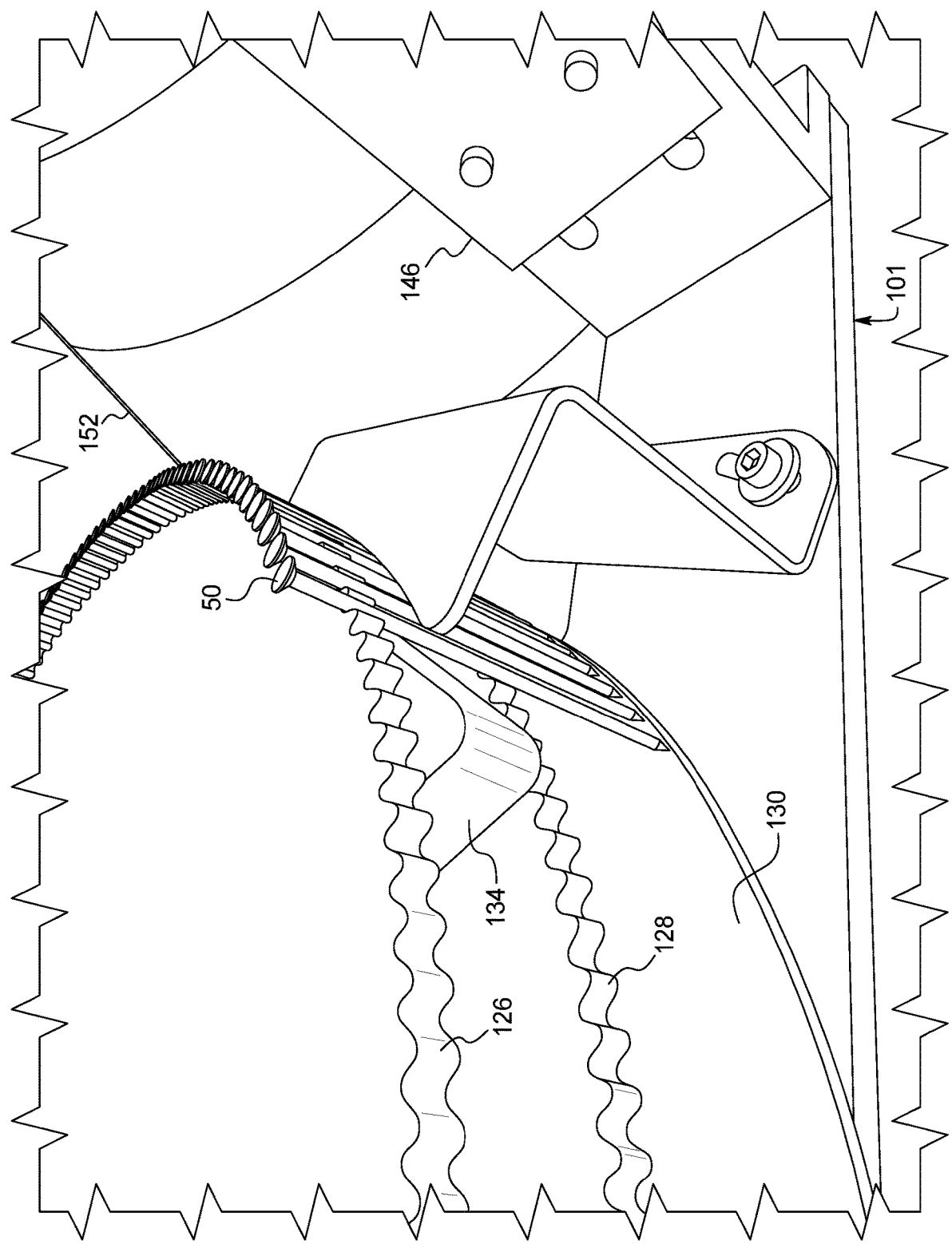
FIG. 6 is an enlarged fragmentary side view of the rotatable slotted fastener conveyer and a wedge of the rotatable slotted fastener conveyer of the corrosion-resistant coating applicator of FIG. 2.
Figure 7:
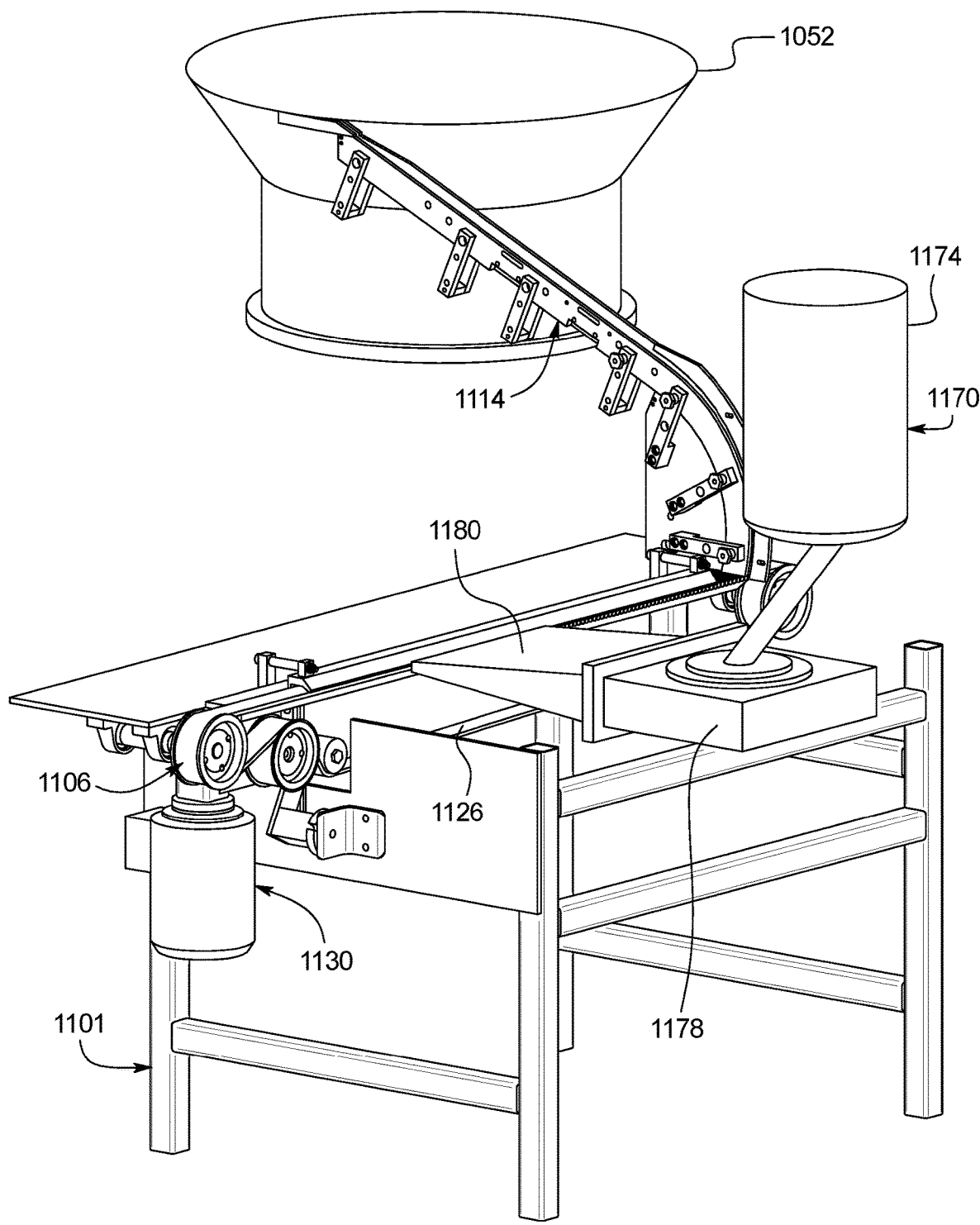
FIG. 7 is a side perspective view of a bead blaster apparatus of one example embodiment of the present disclosure which is configured to work in conjunction with the corrosion-resistant coating applicator of the present disclosure.
Figure 8:
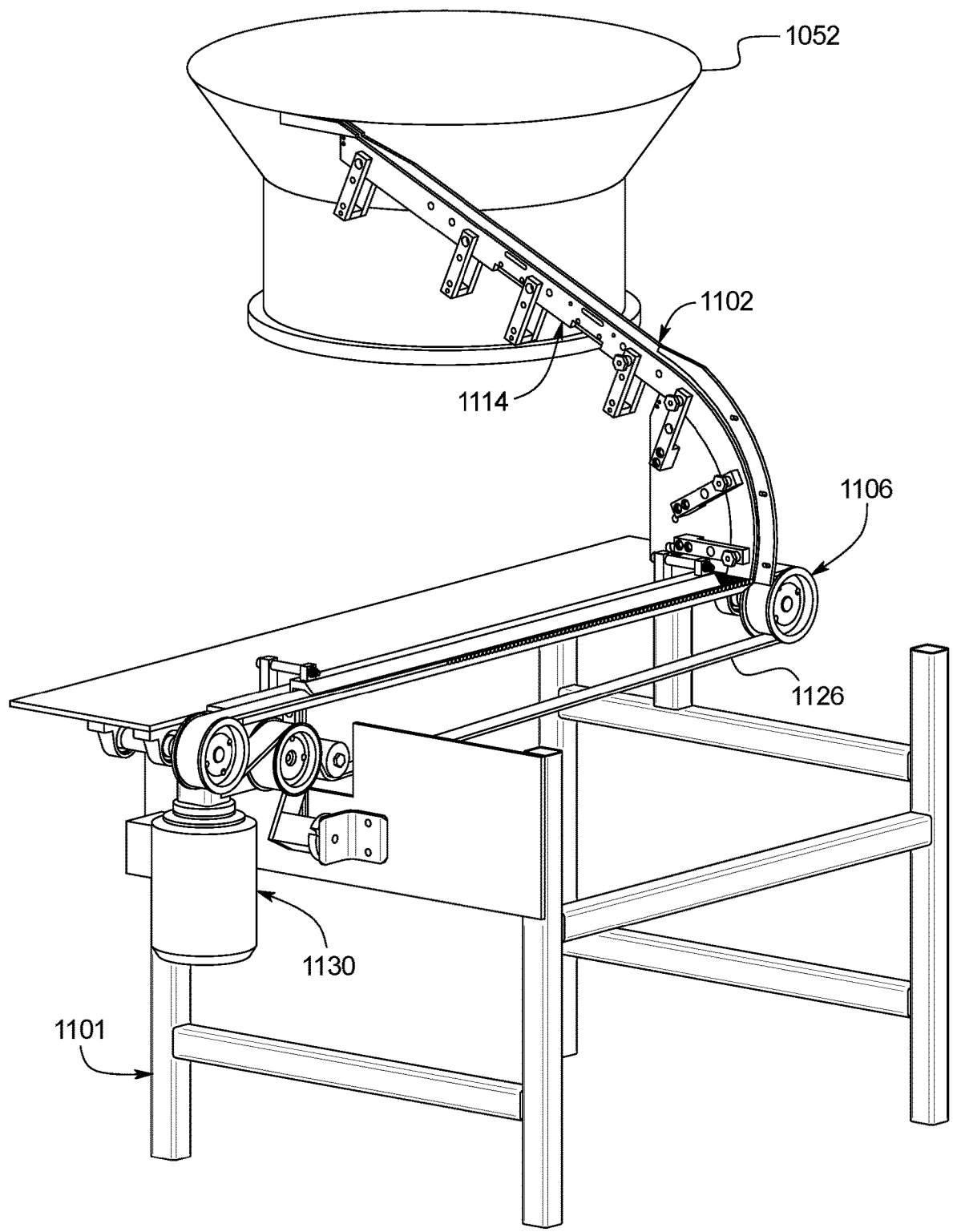
FIG. 8 is a side perspective view of the bead blaster apparatus of FIG. 7 with the grit spray assembly of the bead blaster apparatus removed from the supporting structure to better illustrate the supporting structure, the slotted fastener conveyor assembly, and the feeder.
Figure 9:
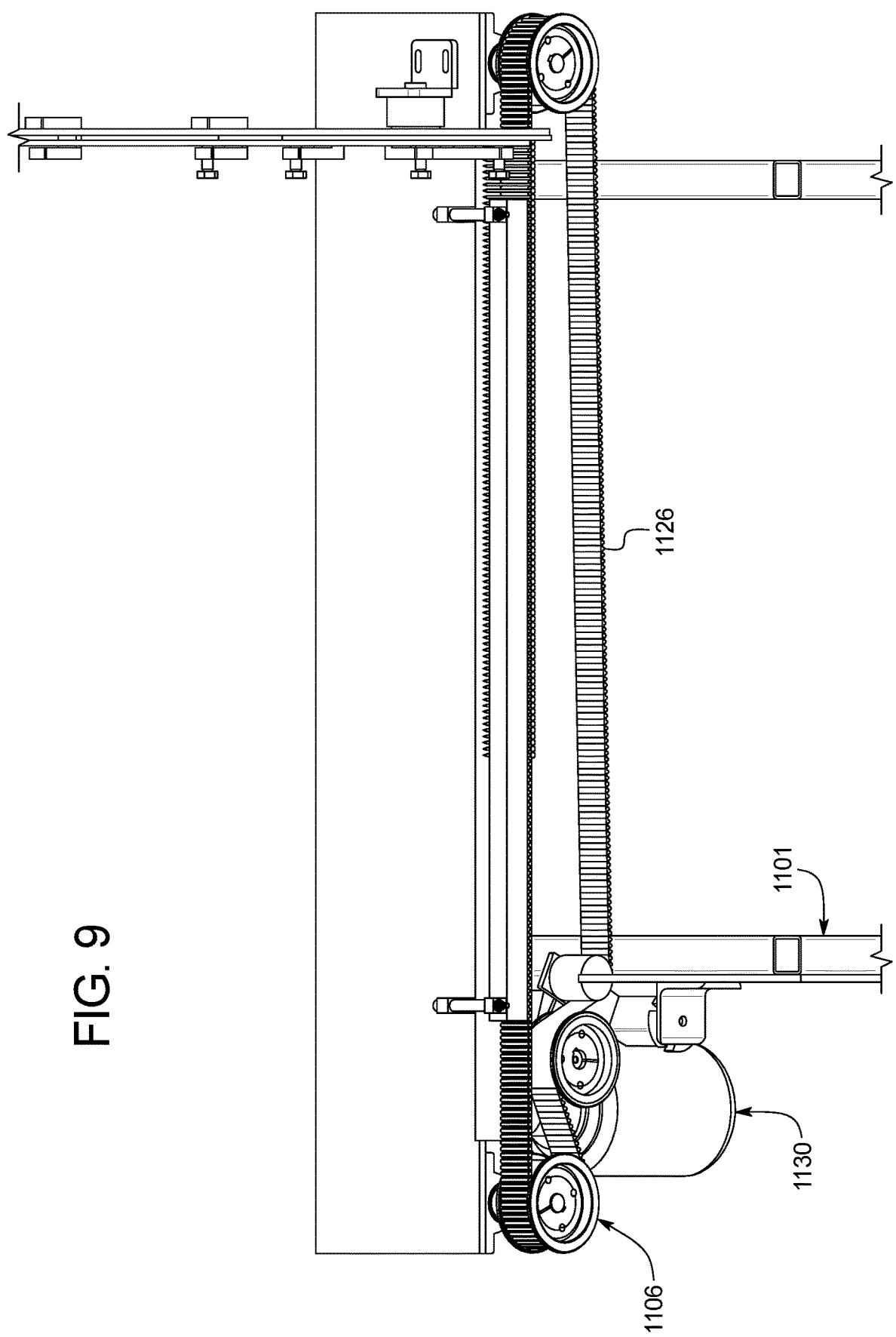
FIG. 9 is a top fragmentary perspective view of the bead blaster apparatus of FIG. 7 with the grit spray assembly of the bead blaster apparatus removed from the supporting structure to better illustrate the supporting structure, the slotted fastener conveyor assembly, and the feeder.
Figure 10:
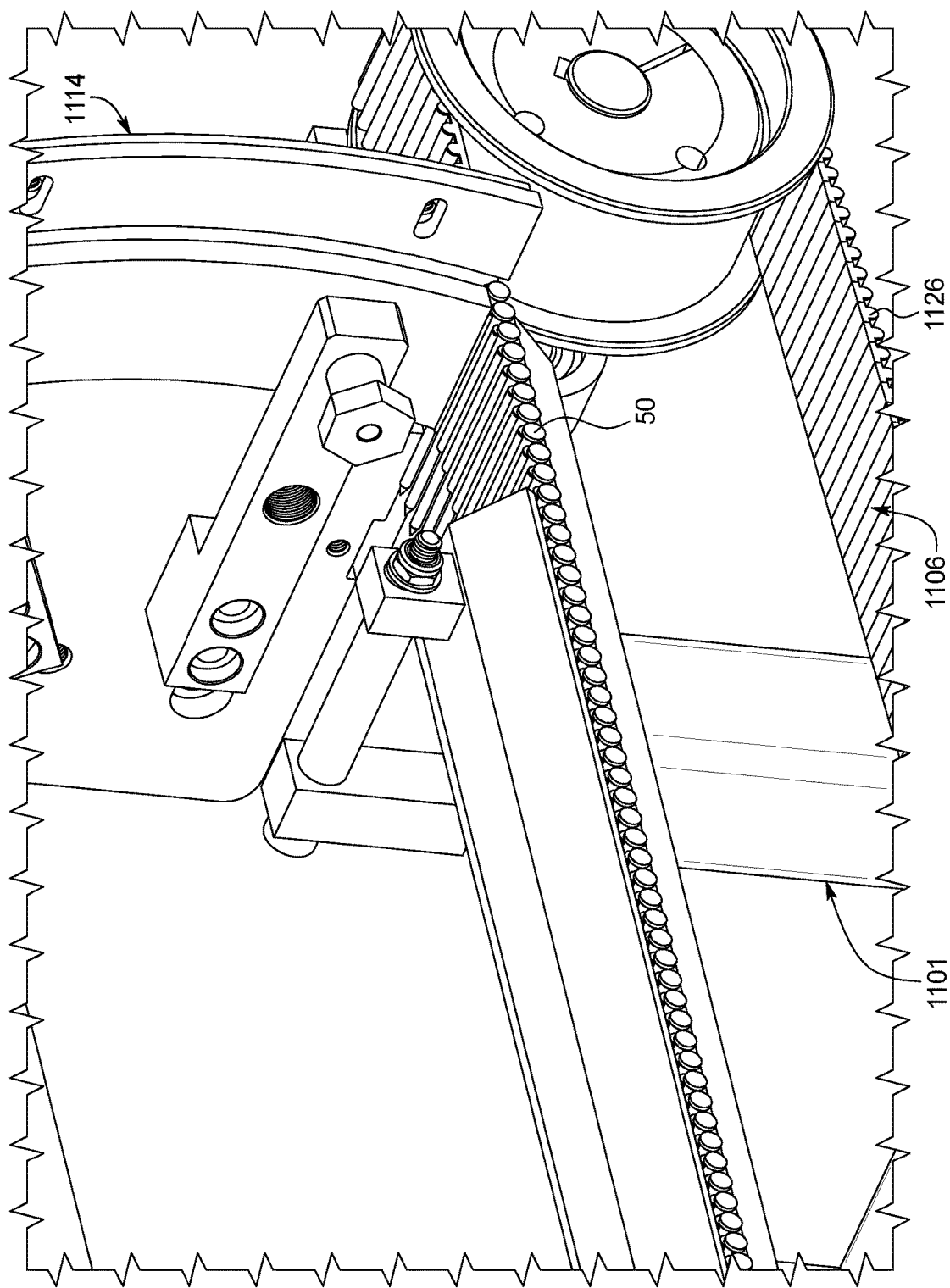
FIG. 10 is an enlarged fragmentary perspective view of part of the feeder and the slotted fastener conveyor assembly of the bead blaster apparatus of FIG. 7.

The first rotatable slotted plate 126 and the second rotatable slotted plate 128 define slots substantially equally spaced around their perimeters (as best shown in FIGS. 2, 3, and 6). The slots of the first rotatable slotted plate 126 are defined to be aligned with the slots of the second rotatable slotted plate 128. The slots are C-shaped in this illustrated embodiment. The diameters of the slots are slightly larger than the diameters of the shanks of the fasteners 50. The fasteners 50 fit within the respective aligned slots of the first rotatable slotted plate 126 and the second rotatable slotted plate 128.

The first rotatable slotted plate 126, the second rotatable slotted plate 128, and the rotatable base plate 130 are spaced apart so that the distance between the first rotatable slotted plate 126 and the rotatable base plate 130 is shorter than a length of the shank portions of the fasteners 50. When the fasteners 50 are loaded onto the rotatable slotted fastener conveyer 106, the head portions of the fasteners 50 are exposed above the surface of the first rotatable slotted plate 126. The end of each fastener 50 opposite the head portion of that fastener 50 touches the rotatable base plate 130 as a result of the downward forces exerted by the fastener aligner 108.

The magnets 132 are configured to hold the fasteners 50 to the rotatable slotted fastener conveyer 106. In the illustrated example embodiment, the magnets 132 are situated between the first rotatable slotted plate 126 and the second rotatable slotted plate 128. The magnets 132 are recessed so that the magnets 132 do not contact the fasteners 50 when the fasteners 50 are positioned in the slots. The magnetic force of the magnets 132 secures the fasteners 50 in the slots. In the illustrated example embodiment, the magnets 132 extend along part of the perimeter of the first rotatable slotted plate 126 and the second rotatable slotted plate 128. In certain example embodiments, the magnets 132 extend along half of the perimeter of the first rotatable slotted plate 126 and the second rotatable slotted plate 128.

The wedge 134 is positioned on the opposite side of the rotatable slotted fastener conveyer 106 from where the feeder 102 loads the fasteners 50 to the rotatable slotted fastener conveyer 106. The wedge 134 is located between the first rotatable slotted plate 126 and the second rotatable slotted plate 128 (as best shown in FIG. 6). The wedge 134 protrudes from between the first rotatable slotted plate 126 and the second rotatable slotted plate 128. After being coated as discussed below, the rotation of the rotatable slotted fastener conveyer 106 relative to the stationary wedge 134 causes the fasteners 50 to dislodge from the rotatable slotted fastener conveyer 106.

The first rotatable slotted plate 126, the second rotatable slotted plate 128, and the rotatable base plate 130 are suitably connected to the central hub 136 so that the first rotatable slotted plate 126, the second rotatable slotted plate 128, and the rotatable base plate 130 rotate around the axis of the central hub 132 together as the central hub 132 rotates. In this illustrated example embodiment, the first rotatable slotted plate 126, the second rotatable slotted plate 128, and the rotatable base plate 130 rotate around the central hub 136 at a suitable rate of revolutions per minute (RPM). In certain example embodiments, the RPM of the first rotatable slotted plate 126, the second rotatable slotted plate 128, and the rotatable base plate 130 is determined by an amount of time it takes to suitably heat the head portions of the fasteners 50 by the heater 110. The rotatable slotted fastener conveyer 106 conveys the fasteners 50 around its perimeter. The magnets 132 and the wedge 134 are connected to the central hub 136 so that they do not rotate in this illustrated embodiment.

Figure 4:
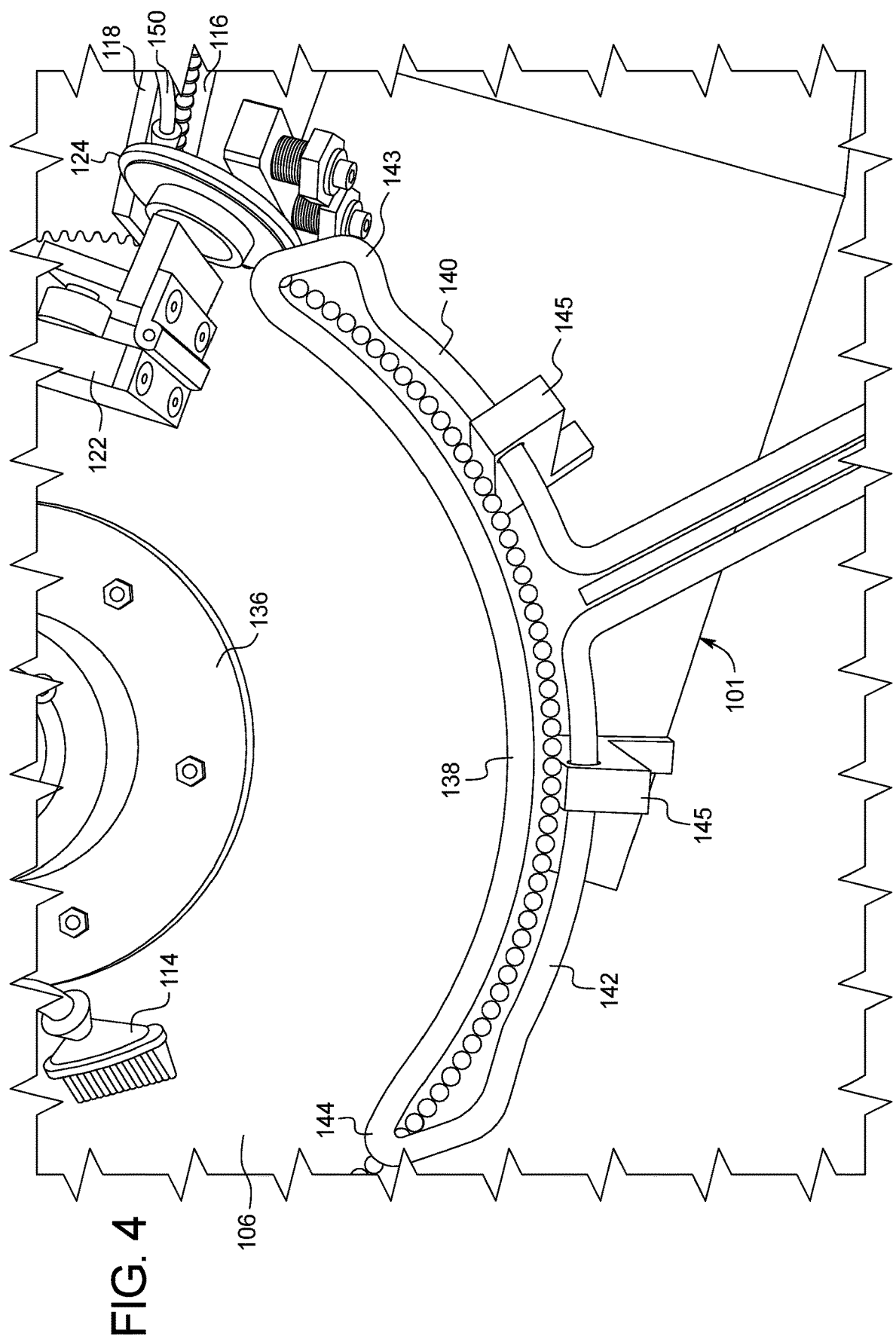
FIG. 4 is an overhead fragmentary perspective view of the rotatable slotted fastener conveyer and a heater of the corrosion-resistant coating applicator of FIG. 2.

As best shown in FIGS. 2 and 4, the heater 110 in this illustrated example embodiment includes: (a) an inner portion 138 positioned to overlap a portion of the rotatable slotted fastener conveyer 106; (b) a first outer portion 140 and a second outer portion 142 positioned to not overlap the rotatable slotted fastener conveyer 106; (c) a first bend portion 143 connecting the inner portion 138 and the first outer portion 140; (d) a second bend portion 144 connecting the inner portion 138 and the second outer portion 142; and (e) mounting brackets 145 configured to support the first outer portion 140 and the second outer portion 142. The inner portion 138, the first outer portion 140, and the second outer portion 142 are curved to follow the perimeter of the rotatable slotted fastener conveyer 106. In certain example embodiments, the inner portion 138 follows between 17% and 25% of the perimeter of the rotatable slotted fastener conveyer 106. The length of the inner portion 138 is determined by the RPM of the rotatable slotted fastener conveyer 106 and the time to heat the head portions of the fasteners 50 to a desired temperature. In various embodiments, depending on the material of the fastener, a suitable temperature range may be utilized for achieving satisfactory adhesion of metal spray to the fastener, such that the coating will survive an impact from a nail gun or hammer.

The first outer portion 140, the first bend portion 143, the inner portion 138, the second bend portion 144, and the second outer portion 142 are metal (such as copper, aluminum, etc.) hollow pipes joined together and define a space between the inner portion 138 and the first and second outer portions 140 and 142 (as shown best in FIGS. 2 and 4). The rotation of the rotatable slotted fastener conveyer 106 relative to the heater 110 causes the fasteners 50 to pass: (i) under the first bend portion 143; (ii) between the inner portion 138 and the first and second outer portions 140 and 142; and (iii) under the second bend portion 144. In the illustrated example embodiment, first outer portion 140, the first bend portion 143, the inner portion 138, the second bend portion 144, and the second outer portion 142 form an induction heater. The heater 110 produces a rapidly alternating magnetic field through the first outer portion 140, the first bend portion 143, the inner portion 138, the second bend portion 144, and the second outer portion 142 as the head portions of the fasteners 50 pass through the space. The heater 110 induces eddy currents in the head portions of the fasteners 50, which cause the head portions of the fasteners 50 to be heated.

In other example embodiments, the heater 110 is configured so that heated gas or fluid passes through the first outer portion 140, the first bend portion 143, the inner portion 138, the second bend portion 144, and the second outer portion 142, or vice versa. The heated gas or fluid causes the heater 110 to heat the head portions of the fasteners 50.

Alternatively, in other example embodiments, the heater 110 includes an open-flame heater. When the heater 110 includes an open-flame heater, the inner portion 138 includes suitable holes or openings that enable or facilitate a natural gas flame heating the head portions of the fasteners 50.

Figure 5:
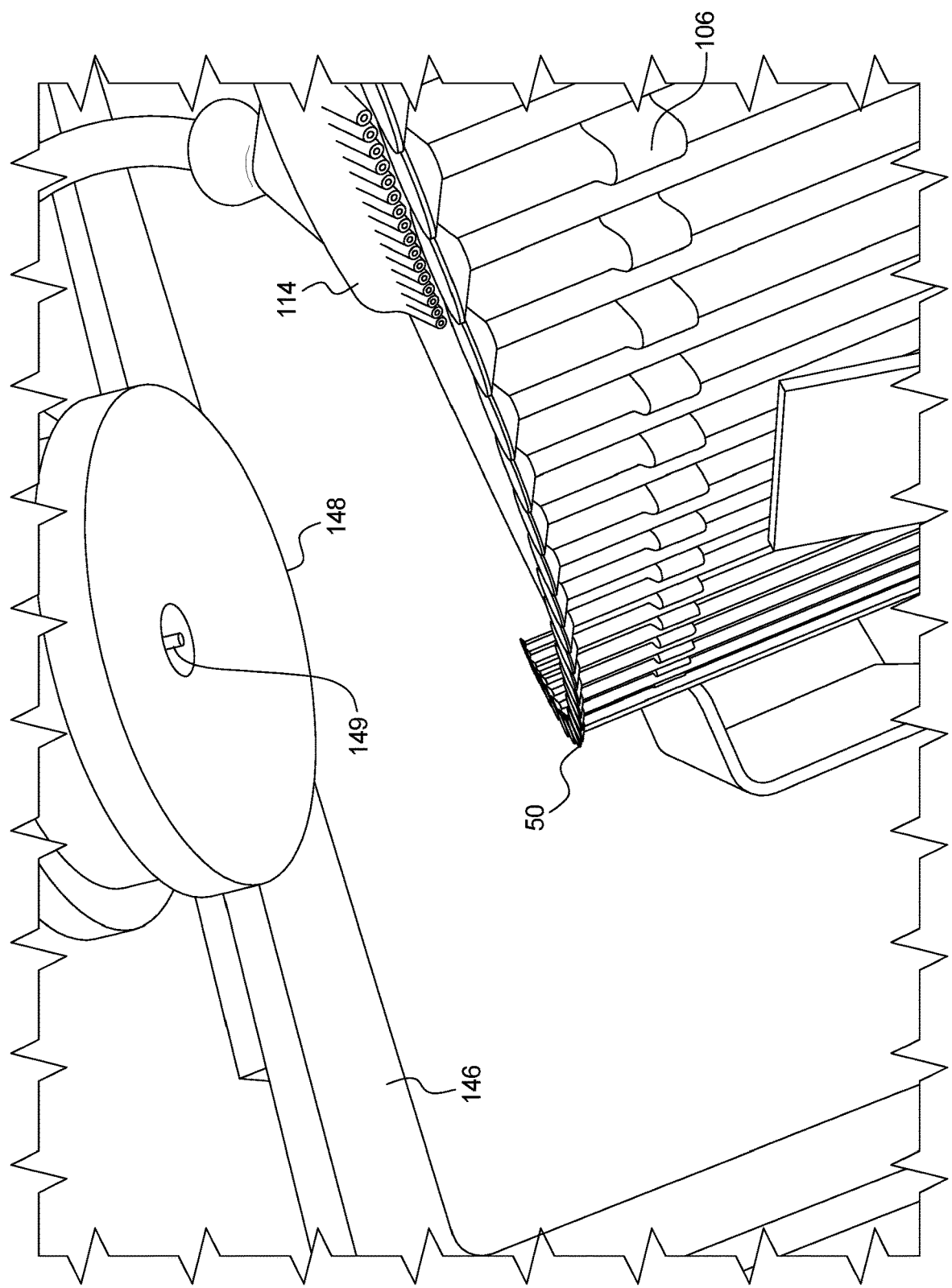
FIG. 5 is an enlarged fragmentary side view of the rotatable slotted fastener conveyer, a sprayer, and a blower of the corrosion-resistant coating applicator of FIG. 2.

The spray assembly 112 in this illustrated example embodiment includes: (a) a support arm 146; and (b) a wire arc sprayer 148. The support arm 146 is supported by the supporting structure 101 in this illustrated embodiment, but could be supported by another suitable supporting structure. The support arm 146 holds or positions the wire arc sprayer 148 over the fasteners 50 as the rotatable slotted fastener conveyer 106 conveys the fasteners 50 (as best shown in FIGS. 1, 2, and 5). The support arm 146 aligns the wire arc sprayer 148 with the longitudinal axis of the shank portion of the fasteners 50. Alternatively, in certain example embodiments, the support arm 146 aligns the wire arc sprayer 148 at a slight angle (such as 1 degree to 10 degrees) from the longitudinal axis of the shank portion of the fasteners 50 (as best shown in FIG. 1). The wire arc sprayer 148 melts a wire made of a corrosion-resistant material. The wire arc sprayer 148 sprays the melted corrosion-resistant material to coat the head portions of the fasteners 50 after the fasteners 50 have been heated by the heater 110. In the illustrated example embodiment, the wire arc sprayer 148 has one nozzle 149. In other example embodiments, the wire arc sprayer 148 may have two or more nozzles. In certain example embodiments, the corrosion-resistant material is zinc. The illustrated example embodiment includes one wire arc sprayer 148. Alternatively, other example embodiments may include two or more wire arc sprayers positioned to spray the corrosion-resistant material on the head portions of the fasteners 50 at appropriate angles, which may be different angles.

The first blower 114 in this illustrated example embodiment is positioned to blow air across the shank portions of the fasteners 50 and across the surface of the first slotted plate 126 of the rotatable slotted fastener conveyer 106 when the sprayer assembly 112 coats the head portions of the fasteners 50 (as best shown in FIGS. 2 and 5). The first blower 114 removes excess corrosion-resistant material spray to reduce the amount of the excess corrosion-resistant material that settles on the shank portions of the fasteners 50 and the rotatable slotted fastener conveyer 106.

An exhaust duct 152 in this illustrated example embodiment is positioned to catch excess corrosion-resistant material (as shown best is FIG. 2). The first blower 114 blows the excess corrosion-resistant material away from the applicator 100 into the exhaust duct 152.

In various example embodiments, the applicator 100 may have one or more cooling or temperature reducing mechanisms (not shown) to cool or reduce the temperature of the fasteners 50 before the wedge 134 dislodges the fasteners 50 from the rotatable slotted fastener conveyer 106, such as additional blowers, fans, etc.

It should be appreciated that a second blower 150 in this illustrated example embodiment is positioned to blow air across the head portions of the fasteners 50 as the feeder 102 loads the fasteners 50 onto the rotatable slotted fastener conveyer 106 (as best shown in FIGS. 2 and 3). The second blower 150 removes metal particulates that accumulate on the head portions of the fasteners 50 while the fasteners 50 are being conveyed by the feeder 102.

In operation, the applicator 100 coats the head portions of the fasteners 50 with the corrosion-resistant material. As shown in FIG. 3, the feeder 102 loads the fasteners 50 into the slots of the rotatable slotted fastener conveyer 106. The magnets 132 of the rotatable slotted fastener conveyer 106 hold the fasteners 50 in place. The second blower 150 blows air on the head portion of the fasteners 50 to remove metal particulates. This blower is also employed in certain embodiments to cause continuous rotation of the fasteners 50 and particularly the fastener heads. The fastener aligner 108 exerts a downward force on the fasteners 50 so the head portions of the fasteners 50 are aligned with each other. As shown in FIG. 4, the rotatable slotted fastener conveyer 106 conveys the fasteners 50 through the heater 110. The heater 110 heats the head portions of the fasteners 50. As shown in FIG. 5, the rotatable slotted fastener conveyer 106 conveys the fasteners 50 under the arc wire sprayer 148 of the spray assembly 112. The arc wire sprayer 148 applies the corrosion-resistant material and specifically in various embodiments the molten or semi-molten metal to the heated head portions of the fasteners 50. The first blower 114 blows air on the shank portions of the fasteners 50 to remove excess corrosion-resistant material. As shown in FIG. 6, the wedge 134 of the rotatable slotted fastener conveyer 106 dislodges the fasteners 50 from the rotatable slotted fastener conveyer 106.

It should be appreciated from above that one method of manufacturing fasteners of the present disclosure includes: (a) loading the fasteners 50 into the slots of the rotatable slotted fastener conveyer 106; (b) blowing air on the head portion of the fasteners 50 to remove metal particulates; (c) exerting a downward force on the fasteners 50 so the head portions of the fasteners 50 are aligned with each other; (d) conveying the fasteners 50 through the heater 110; (e) heating the head portions of the fasteners 50; (f) conveying the fasteners 50 under the spray assembly 112; (g) applying the corrosion-resistant material and specifically in various embodiments the molten or semi-molten metal to the head portions of the fasteners 50; and (h) removing the fasteners 50 from the rotatable slotted fastener conveyer 106.

It should be appreciated that in various embodiments, the present disclosure provides a method of applying a corrosion-resistant coating to a fastener suitable primarily for use within a power driving tool, but that the fastener can be used in other applications or for other purposes.

In various embodiments, the method generally includes preheating an area of the fastener to be coated (such as the head of the fastener) to elevate a temperature of the area to be coated, and spraying the preheated area of the fastener with a molten or semi-molten metal. The sprayed metal provides a sacrificial cathodic corrosion protection to the heated area of the fastener and particularly to the head of the fastener.

In various embodiments, the sprayed metal is selected from the group consisting of at least one of the following: zinc, aluminum, and alloys thereof.

It should further be appreciated that in various embodiments, the fastener is made from a wire with a cathodic protection metal coating. In various such embodiments, the cathodic protection metal coating is a hot-dip galvanization. In various such embodiments, the cathodic protection metal coating is an electroplated coating. In various embodiments, the metal spray is of substantially the same metal or alloy of the cathodic protection metal coating.

It should further be appreciated that in various embodiment, the metal sprayed-on coating meets or attaches to the heated areas of the fastener such as the head of the fastener without diffusing into that heated area. One advantage of coating the head of the fastener without diffusing into this area of the head of the fastener is that the head of the fastener does not have to be heated to a diffusion enabling temperature (i.e., a temperature where the head is at or close to its melting point), and thus is not weakened by such relatively high temperature. Thus, the head of the fastener is not weakened or substantially weakened by the heating process, and the method of the present disclosure thus consistently provides stronger and straighter fasteners. An advantage of the present disclosure is that it provides a method of applying a metal coating on the head with a thickness otherwise only practically attainable through batch hot-dip galvanizing, without the drawback of potentially weakening the fastener and its head from exposure to high temperatures.

It should be appreciated that in various embodiments, the head, head portion, or head surface of the fastener is sand blasted, grit or bead blasted, or shot blasted prior to heating and spraying as further described below. This added cleaning, roughening, and/or abrading of the head surface adds robustness to the process and helps to ensure an acceptable adhesion of the sprayed metal to the substrate.

In one example embodiment of the present disclosure, a pre-plated carbon steel wire of a specified diameter, bending yield strength, and hot dip galvanized ("HDG") zinc plating thickness is manufactured or otherwise obtained (such as by purchasing from a wire manufacturer). One such example pre-plated wire has a diameter of 0.117 inches, a bending yield strength of 32.4 Newtons, and HDG plating with minimum average thickness of approximately 50 microns of zinc. The pre-plated wire is cut and headed in a conventional cold heading machine to make the fasteners (and particularly the nails). After the cutting and heading processes, each fastener made from the pre-plated wire has a shank portion and a head portion integrally formed with the shank portion. Each fastener has the same minimum 50 micron thickness of zinc along the length of the shank portion, but the top surface of the head portion only possesses 0 to 5 microns in total thickness. Each fastener then has zinc thermal-sprayed onto its heated head portion as described above in accordance with the present disclosure. The resulting fastener head portion surface will then have a minimum of 50 microns of zinc to match the rest of the fastener, and particularly the shank portion of the fastener. The bending yield strength of the fastener will be the same as the pre-plated wire since it is not affected (i.e., weakened) by the thermal spray process. In other words, this process does not weaken the shank portion of the fastener and thus overcomes the problems in the prior art described above that cause the entire fastener to be weakened by the batch galvanization process.

The advantage of this process of the present disclosure was tested in comparison to the existing process and resulted in an avoidance of a 9% weakening of the fastener. More specifically, a carbon steel wire having a diameter of 0.117 inches and a bending yield strength of 31.3 Newtons was obtained. The wire was cut and headed in a conventional cold heading machine to make the nails. After the cutting and heading processes, each nail formed from the pre-plated wire had a shank portion and a head portion integrally formed with the shank portion. Each nail was then conventionally hot-dip galvanized in a batch process that exposed each nail to temperatures up to 600 centigrade for several minutes. The resulting nails were coated with zinc with a minimum thickness of 50 microns on all surfaces. The bending yield strength of the nails galvanized in this manner experienced a decrease in yield strength from 31.3 Newton to 28.4 Newtons (which is a reduction of 9%). Thus, the process of the present disclosure described above overcame this reduction.

The tests were conducted per European standard EN 409, wherein the yield moments of the nails were measured. In this test, each nail's shank portion is bent to a 45-degree angle over the course of 8 seconds. The amount of force required to cause the nail to plastically yield is then determined from the collected data.

In one instance as indicated above, the nails were tested to exhibit the potential for the batch HDG process to weaken nails. One lot of carbon steel nails with a diameter of 3.1 mm was selected for testing. Thirty nails from this lot were tested, and they were found to have an average bending force of 31.3 Newtons and average bending yield moment if 4.2 Newton-meters. Nails from the same lot were subjected to a batch galvanizing (HDG), and subsequent testing was performed on thirty HDG-processed nails. The resulting average bending force was 28.4 Newtons, and the average bending yield moment was 3.9 Newton-meters. These results represent a reduction in bending strength of approximately 9% due to the HDG processing.

In another instance, nails were tested to measure the effects of the disclosed invention upon nail bending strength. A lot of the nails was made from steel wire with a pre-plated HDG finish and a diameter of 3.1 mm. Thirty nails from this lot were tested, and they were found to have an average bending force of 32.4 Newtons and average bending yield moment of 4.4 Newton-meters. Nails from the same lot were subjected to preheating and their heads were thermal sprayed with zinc to a thickness of approximately 50 microns. Subsequent testing was performed on thirty thermal-sprayed nails. The resulting average bending force was 32.4 Newtons, and the average bending yield moment was 4.4 Newton-meters. These results show that the process of thermal spraying the nail heads with zinc did not reduce the structural strength of the nails.

It should be appreciated from the above that in various embodiments, the present disclosure also provides corrosion-resistant coated fasteners 50 (such as nails) made using the coating methods and/or coating apparatus described herein.

Figure 11:
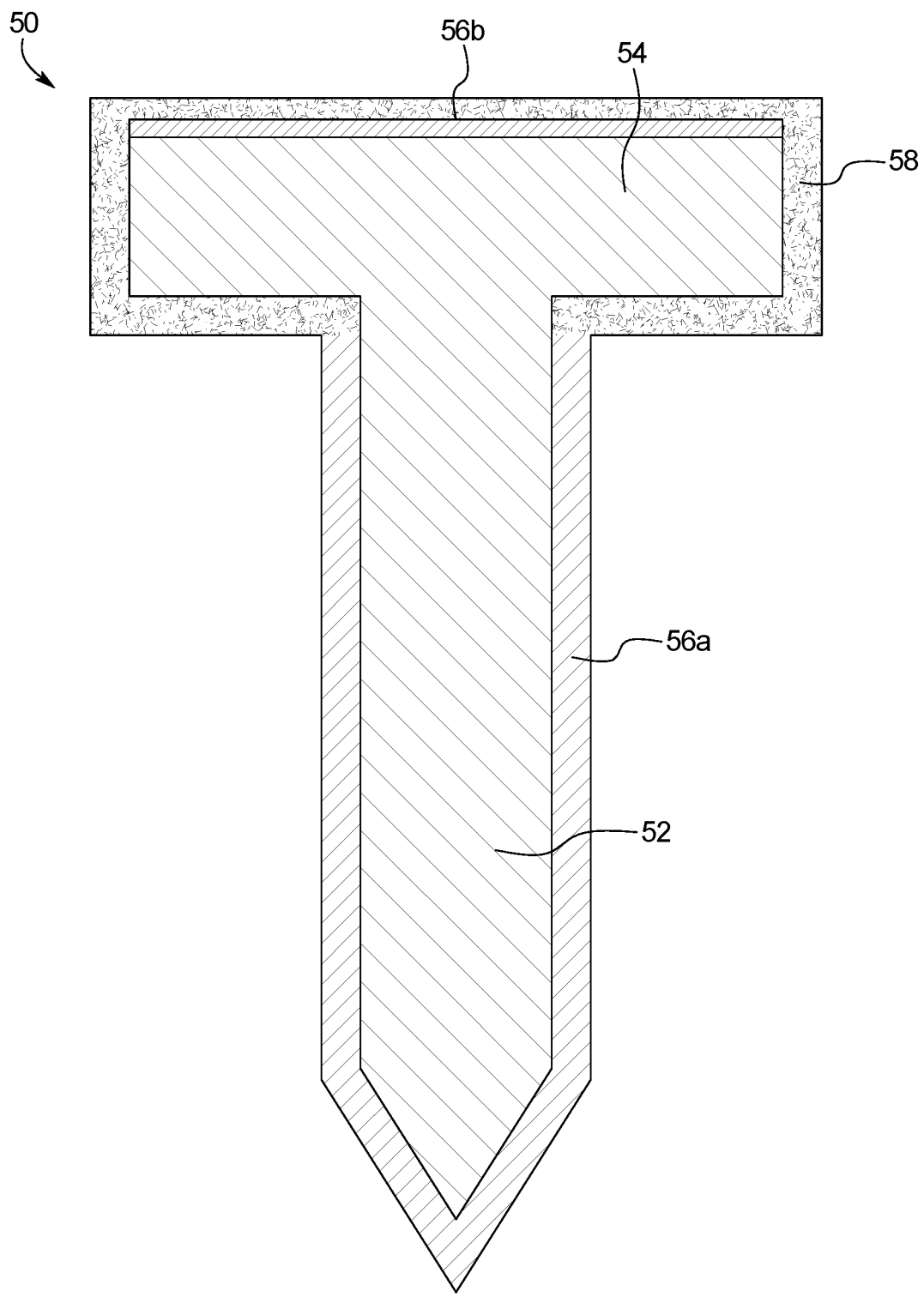
FIG. 11 is an enlarged cross-sectional view of a corrosion-resistant fastener of one example embodiment of the present disclosure, showing the fastener having a cathodic protection metal coating and showing the fastener having a sprayed-on metal coating.

For example, as shown in FIG. 11, in various embodiments, the present disclosure provides a corrosion-resistant coated fastener 50 including a shank portion 52 having a cathodic protection metal coating 56a, and a head portion 54 integrally connected to the shank portion 52, wherein the head portion 54 has a sprayed-on metal coating 58. In certain such embodiments, the sprayed-on metal coating 58 on the head portion 54 provides a sacrificial cathodic corrosion protection to the head portion 54 of the fastener 50. In certain such embodiments, the sprayed-on metal coating 58 is selected from the group consisting of at least one of the following: zinc, aluminum, and alloys thereof. In certain such embodiments, the cathodic protection metal coating 56a is a hot-dip galvanized coating. In certain such embodiments, the cathodic protection metal coating 56a is an electroplated coating. In certain such embodiments, the metal sprayed-on coating 58 is of substantially the same metal or alloy as the cathodic protection metal coating 56a.

In one such embodiment, the fastener 50 is made from a pre-plated carbon steel wire of having a diameter of 0.117 inches, a bending yield strength of 32.4 Newtons, and HDG plating with minimum average thickness of approximately 50 microns of zinc. After the cutting and heading processes, the resulting fastener will have the same minimum 50 micron thickness of zinc (e.g., the cathodic metal coating 56a) along the length of the shank portion 52, but the top surface of the head portion 54 will only possess 0 to 5 microns in total thickness of zinc (e.g., the cathodic metal coating 56b). The head portion will have the zinc spray coating 58 in accordance with the present disclosure, and the resulting fastener head portion 54 surface will have a minimum of 50 microns of zinc to match the rest of the fastener 50 and particularly the shank portion 52 of the fastener. The bending yield strength of the fastener will be approximately 32.4 Newtons that matched the pre-sprayed fastener.

As mentioned above, in various additional embodiments of the present disclosure, the head, head portion, or head surface of the fastener is sand blasted, grit or bead blasted, or shot blasted prior to the heating and spraying steps.

In certain alternative embodiments, the top surface of the head portion of the fastener is roughened using a wheel abrader.

In certain such embodiments, the top surface of the head portion of the fastener is grit or bead blasted using a suitable hard steel grit or grit media.

In certain such embodiments, the grit or grit media includes a diamond grit having an average or approximate size of 0.039 to 0.063 inches (approximately 1.00 to 1.60 millimeters) with a hardness of approximately 680 to 800 HV (Vickers Hardness test) or 59 to 64 HRC (Rockwell Hardness test). In certain such embodiments, the grit or bead blasting is performed at approximately 230 to 246 feet per second (approximately 70 to 75 meters per second). These embodiments tend to reduce or eliminate the rounding of the edges of the diamond grit media such that it can be reused which saves expense and reduces environmental waste.

In certain such embodiments, the top surface of the head portion of the fastener is roughened using centrifugal abrasive bead blasting apparatus that propels the abrasive media (such as the hard steel grit) through a nozzle that creates a focused but wide spay pattern that impacts the top surfaces of the head portions of the fasteners multiple times as the fasteners are conveyed in a linear manner.

Turing now to FIGS. 7, 8, 9, and 10, one example embodiment of a bead blaster apparatus of the present disclosure is generally illustrated. The example embodiment of the bead blaster apparatus 1000 generally includes: (a) a supporting structure 1101; (b) a slotted fastener conveyer assembly 1106 supported by the supporting structure 1101 and configured to receive and move the fasteners 50 as explained below; (c) a feeder 1102 supported by the supporting structure 1101 and configured to feed fasteners 50 to the slotted fastener conveyer assembly 1106; and (d) a grit spray assembly 1170 configured to atomize and direct grit or grit media (not shown) such as the diamond grit described above toward the top surfaces of the head portions of the fasteners 50 being conveyed by the slotted fastener conveyer 1106. In the illustrated example embodiment, the fasteners 50 are nails. It should be appreciated that the fasteners can be any suitable fasteners (such as framing nails, finish nails, screws, rivets, bolts, etc.).

More specifically, the feeder 1102 in this illustrated example embodiment includes: (a) a suitable holding and feeding mechanism such as example bowl holding and feeding mechanism 1052; and (b) a guide assembly 1114 connected to the bowl holding and feeding mechanism 1052. The feeder 1102 is supported by the supporting structure 1101 in this illustrated embodiment, but can be alternatively supported by another suitable supporting structure. The guide assembly 1114 is configured to direct the fasteners 50 one by one in a single row from the bowl holding and feeding mechanism 1052 to the slotted fastener conveyer assembly 1106.

In certain embodiments, the bead blaster apparatus 1000 includes one or more suitable fastener aligners (not shown) configured to contact with the fasteners such as the top surfaces of the head portions of the fasteners 50 after the fasteners 50 are positioned on the slotted fastener conveyer 1106 to make sure that the head portions of the fasteners 50 are aligned, level, or flush with each other.

The slotted fastener conveyer 1106 in this illustrated example embodiment includes: (a) a slotted conveyor belt 1126; and (b) a suitable conveyor belt driving assembly 1130 configure to control and move or rotate the slotted conveyor belt 1126. The slotted fastener conveyer belt 1106 and the conveyor belt driving assembly 1130 are supported by the supporting structure 1101 in this example embodiment.

The grit spray assembly 1170 in this illustrated embodiment generally includes: (a) a grit media feeder 1174; (b) a grit media director 1178; and (c) grit media directing nozzle 1180. The grit media feeder 1174, the grit media director 1178, and the grit media directing nozzle 1180 are supported by the supporting structure 1101 in this illustrated example embodiment, but could be supported in another manner or by another suitable supporting structure. The grit media feeder 1174 is connected to the grit media director 1178 and is configured to hold grit media and to direct grit media to grit media director 1178. The grit media director 1178 is suitably powered and configured to receive grit media from the grit media feeder 1174 and to atomize the received grit media and direct the atomized grit media into the grit media directing nozzle 1180. The grit media directing nozzle 1180 is configured to further direct the atomized grit media towards the top surfaces of the head portions of the fasteners 50 as the fasteners are moved in front of or by the grit media directing nozzle 1180 by the slotted fastener conveyer 1106. It should be appreciated that in this example embodiment, the slotted fastener conveyer assembly 1106 and the grit spray assembly 1170 are configured such that grit media will be directed at each fastener or top surface of each head portion of each fastener multiple times as that fastener 50 passes in front of or by the grit media directing nozzle 1180.

It should be appreciated that the bead blaster apparatus of the present disclosure can be a standalone system or can be alternatively configured to be integrated with the spray coating applicator of the present disclosure. In certain such embodiments, the fastener conveyor mechanisms are suitably integrated.

It should be appreciated that the combination of cleaning, the abrading, and the heating of the head portions of the fastener described herein co-act to insure a proper adhesion of the sprayed molten metal such as zinc to the fasteners head portions.

In various alternative embodiments of the present disclosure, the top surface of the head portion of the fastener is abraded, sand blasted, grit or bead blasted, or shot blasted after heating and prior to spraying.

In various alternative embodiments of the present disclosure, the top surface of the head portion of the fastener is abraded, sand blasted, grit or bead blasted, or shot blasted prior to spraying, but is not heated.

In other various embodiments of the present disclosure, the head portion of each fastener is heated to a temperature within the range of approximately 356 to 500 degrees Fahrenheit (approximately 180 to 260 degrees Celsius).

Various additional embodiments of the present disclosure include applying a suitable sealer over the thermal spray coating on the head portion of the fastener (such as the zinc spray coating on the head portion of the fastener). In certain such embodiments, the sealer includes an alkali silicate in a polymeric binder. In certain such embodiments, the sealer includes a sodium silicate in an ethylene-acrylic copolymer binder.

In various embodiments, the sealer preserves the thermal spray coating such as the zinc from oxidation or substantial oxidation.

In various embodiments, the sealer prevents or reduces friction welding or sticking of the thermal spray coating (such as the zinc) on the top surface of the head portion of the fastener to the end of the driver blade in a fastener driving tool. In other words, the sealer reduces the removal of zinc from the top surfaces of the head portions of the fasteners as they are driven into the substrate.

Various additional embodiments of the present disclosure include applying a suitable sealer (such as described above) over the thermal spray coating on the head portion of the fastener (such as the zinc spray coating on the head portion of the fastener) and a suitable top coating on the sealer. In certain such embodiments, the top coat includes an aliphatic urethane filled with anti-corrosion pigments. In certain such embodiments, the top coat can be one of the top coats described in U.S. Pat. No. 7,641,432.

Various additional embodiments of the present disclosure include applying a suitable top coat (such as described above) over the thermal spray coating on the head portion of the fastener (such as the zinc spray coating on the head portion of the fastener).

It should be appreciated that in various embodiments, the method of the present disclosure includes: (a) forming the head portions of the fasteners from pre-galvanized wire; (b) threading the fasteners if required; (c) cleaning, rinsing, and drying the fasteners in an aqueous cleaning solution to remove lubricants; (d) abrading the top surfaces of the head portions of the fasteners (such as by using one or more of the methods or apparatus described herein); (e) feeding the fasteners to an applicator that orients the fasteners; (f) preheating the head portions of the fasteners to be coated to elevate a temperature of the head portions of the fasteners to be coated; (g) spraying the preheated heads portions of the fasteners with a molten or semi-molten metal (such as zinc); (h) discharging the fasteners from the applicator; (i) moving the fasteners to an in-line collation system to collate the fasteners into fastener assembly strips; (j) applying a sealer to the head portions of the fasteners; and (k) applying a top coat over the sealer on the head portions of the fasteners.

It should be appreciated from the above, that in various embodiments, the present disclosure provides a method of applying a corrosion-resistant coating to a fastener suitable for use within a power driving tool, the method comprising: preheating an area of the fastener to be coated to elevate a temperature of the area of the fastener to be coated; and spraying the preheated area of the fastener with a molten or semi-molten metal.

In certain such embodiments of this method, the sprayed metal provides a sacrificial cathodic corrosion protection to the heated area of the fastener.

In certain such embodiments of this method, the sprayed metal is selected from the group consisting of at least one of the following: zinc, aluminum, and alloys thereof.

In certain such embodiments of this method, the fastener is made from a wire with a cathodic protection metal coating.

In certain such embodiments of this method, the cathodic protection metal coating includes a hot-dip galvanization.

In certain such embodiments of this method, the cathodic protection metal coating includes an electroplated coating.

In certain such embodiments of this method, the metal spray is of substantially the same metal or alloy as the cathodic protection metal coating.

In certain such embodiments, this method includes one of sand blasting, grit or bead blasting, and shot blasting the area prior to heating and spraying the area.

In certain such embodiments, this method includes applying a sealer to the area of the fastener after spraying the preheated area of the fastener with the molten or semi-molten metal.

In certain such embodiments, this method includes applying a top coat to the area of the fastener after applying the sealer to the area of the fastener.

It should be appreciated from the above, that in various embodiments, the present disclosure provides a method of manufacturing a fastener made from a wire with a cathodic protection metal coating, the method comprising: feeding the fastener to a slotted fastener conveyer; aligning a head portion of the fastener on the slotted fastener conveyer; conveying the fastener along a perimeter of the slotted fastener conveyer; heating the head portion of the fastener being conveying along the perimeter of the slotted fastener conveyer; spraying a corrosion-resistant metal coating to the heated head portion of the fastener being conveying along the perimeter of the slotted fastener conveyer to coat the head portion with a sacrificial cathodic corrosion protection; and dislodging the fastener from the slotted fastener conveyer.

In certain such embodiments, this method includes holding the fastener to the slotted fastener conveyer via a magnetic force.

In certain such embodiments, this method includes blowing air at the head portion of the fastener before the fastener is heated.

In certain such embodiments of this method, heating the head portion of the fastener being conveyed along the perimeter of the slotted fastener conveyer includes heating the head portion of the fastener with induction heating.

In certain such embodiments of this method, heating the head portion of the fastener being conveyed along the perimeter of the slotted fastener conveyer includes heating the head portion of the fastener with open-flame heating.

In certain such embodiments of this method, the corrosion-resistant coating is applied at a first angle, and the method includes applying a second corrosion-resistant coating at a second angle to the head portion of the fastener being conveyed along the perimeter of the slotted fastener conveyer.

In certain such embodiments, this method includes blowing air across a shank portion of the fastener when the corrosion-resistant coating is applied.

In certain such embodiments, this method includes one of sand blasting, grit or bead blasting, and shot blasting the head portion of the fastener prior to heating and spraying the head portion of the fastener.

In certain such embodiments of this method, the slotted fastener conveyer is rotatable, and this method includes rotating the slotted fastener convey to convey the fastener along the perimeter of the slotted fastener conveyer.

In certain such embodiments, this method includes applying a sealer to the head portion of the fastener after spraying the preheated head portion of the fastener with a molten or semi-molten metal.

In certain such embodiments, this method includes applying a top coat to the head portion of the fastener after applying a sealer to the head portion of the fastener.

It should be appreciated from the above, that in various embodiments, the present disclosure provides a corrosion-resistant coating applicator comprising: (a) a support structure; (b) a slotted fastener conveyer supported by the support structure; (c) a feeder configured to feed fasteners to the slotted fastener conveyer; (d) a fastener aligner configured to align head portions of the fasteners with one another; (e) a heater configured to heat the head portions of the fasteners as the fasteners are being conveyed by the slotted fastener conveyer; and (f) a spray assembly configured to apply corrosion-resistant metal coatings to the heated head portions of the fasteners being conveyed by the slotted fastener conveyer.

In certain such embodiments of the corrosion-resistant coating applicator, the slotted fastener conveyer includes: (a) a first slotted plate; (b) a second slotted plate aligned with the first rotatable slotted plate; (c) a based plate aligned with the first rotatable slotted plate; (d) at least one magnet between the first slotted plate and the second slotted plate and configured to hold the fasteners to the slotted fastener conveyer; (e) a hub, wherein the first slotted plate, the second slotted plate, and the based plate are connected to the hub; and (f) a wedge non-rotatably connected to the hub between the first slotted plate and the second slotted plate, the wedge configured to remove the fasteners from the slotted fastener conveyer, and the magnets.

In certain such embodiments of the corrosion-resistant coating applicator, the first slotted plate and the second slotted plate define aligned equally spaced slots along their respective perimeters.

In certain such embodiments of the corrosion-resistant coating applicator, the slots are configured to each fit one of the fasteners.

In certain such embodiments of the corrosion-resistant coating applicator, the slotted fastener conveyer includes: (a) a first rotatable slotted plate; (b) a second rotatable slotted plate aligned with the first rotatable slotted plate; (c) a rotatable based plate aligned with the first rotatable slotted plate; (d) at least one magnet between the first rotatable slotted plate and the second rotatable slotted plate and configured to hold the fasteners to the rotatable slotted fastener conveyer; (e) a central hub, wherein the first rotatable slotted plate, the second rotatable slotted plate, and the rotatable based plate are rotatably connected to the central hub; and (f) a wedge non-rotatably connected to the central hub between the first rotatable slotted plate and the rotatable second slotted plate, the wedge configured to remove the fasteners from the rotatable slotted fastener conveyer, and the magnets.

In certain such embodiments of the corrosion-resistant coating applicator, the first rotatable slotted plate and the second rotatable slotted plate define aligned equally spaced slots around their respective perimeters.

In certain such embodiments of the corrosion-resistant coating applicator, the slots are configured to each fit one of the fasteners.

In certain such embodiments of the corrosion-resistant coating applicator, the heater includes an induction heater.

In certain such embodiments of the corrosion-resistant coating applicator, the heater includes an open-flame heater.

In certain such embodiments of the corrosion-resistant coating applicator, the sprayer is aligned with an axis of a shank portion of each of the fasteners.

In certain such embodiments, the corrosion-resistant coating applicator includes a first blower configured to discard excess portions of the corrosion-resistant coating.

In certain such embodiments, the corrosion-resistant coating applicator includes a second blower to clean the head portions of the fasteners before the fasteners are heated.

It should be appreciated from the above, that in various embodiments, the present disclosure provides a corrosion-resistant coated fastener comprising: a shank portion having a cathodic protection metal coating; and a head portion integrally connected to the shank portion, said head portion having a sprayed-on metal coating layer.

In certain such embodiments of the corrosion-resistant coated fastener, the sprayed-on metal on the head portion provides a sacrificial cathodic corrosion protection to the head portion of the fastener.

In certain such embodiments of the corrosion-resistant coated fastener, the sprayed-on metal coating layer is selected from the group consisting of at least one of the following: zinc, aluminum, and alloys thereof.

In certain such embodiments of the corrosion-resistant coated fastener, the cathodic protection metal coating on the shank portion includes a hot-dip galvanized coating.

In certain such embodiments of the corrosion-resistant coated fastener, the cathodic protection metal coating on the shank portion includes an electroplated coating.

In certain such embodiments of the corrosion-resistant coated fastener, the sprayed-on metal coating layer is of substantially the same metal or alloy as the cathodic protection metal coating.

In certain such embodiments of the corrosion-resistant coated fastener, the cathodic protection metal coating is zinc and the sprayed-on metal coating layer is zinc.

In certain such embodiments of the corrosion-resistant coated fastener, the cathodic protection metal coating is a pre-plated zinc and the sprayed-on metal coating layer is zinc.

In certain such embodiments of the corrosion-resistant coated fastener, a top surface of the head portion is one of sand blasted, grit or bead blasted, and shot blasted under the sprayed-on metal coating layer.

In certain such embodiments, the corrosion-resistant coated fastener includes a sealer on the sprayed-on metal coating layer.

In certain such embodiments, the corrosion-resistant coated fastener includes a top coat on the sealer.

It will be understood that modifications and variations may be effected without departing from the scope of the novel concepts of the present invention, and it is understood that this application is to be limited only by the scope of the claims.

The invention is claimed as follows:

1. A method of applying a corrosion-resistant coating to a fastener suitable for use within a power driving tool, the method comprising:
   feeding the fastener to a slotted fastener conveyor;
   aligning a head portion of the fastener on the slotted fastener conveyor;
   conveying the fastener along a perimeter of the slotted fastener conveyor;
   preheating an area of the fastener on the slotted fastener conveyor to be coated to elevate a temperature of the area of the fastener to be coated;
   spraying the preheated area of the fastener with a molten or semi-molten metal; and
   dislodging the fastener from the slotted fastener conveyor.

2. The method of claim 1, wherein the sprayed metal provides a sacrificial cathodic corrosion protection to the pre-heated area of the fastener.

3. The method of claim 1, wherein the sprayed metal is selected from the group consisting of at least one of the following: zinc, aluminum, and alloys thereof.

4. The method of claim 1, wherein the fastener is made from a wire with a cathodic protection metal coating.

5. The method of claim 4, wherein the cathodic protection metal coating includes a hot-dip galvanization.

6. The method of claim 4, wherein the cathodic protection metal coating includes an electroplated coating.

7. The method of claim 4, wherein the metal spray is of substantially the same metal or alloy as the cathodic protection metal coating.

8. The method of claim 1, which includes one of sand blasting, grit or bead blasting, and shot blasting the area prior to preheating and spraying the area.

9. The method of claim 1, which includes applying a sealer to the area of the fastener after spraying the preheated area of the fastener with the molten or semi-molten metal.

10. The method of claim 9, which includes applying a top coat to the area of the fastener after applying the sealer to the area of the fastener.

11. A method of manufacturing a fastener made from a wire with a cathodic protection metal coating, the method comprising:
    feeding the fastener to a slotted fastener conveyor;
    aligning a head portion of the fastener on the slotted fastener conveyor;
    conveying the fastener along a perimeter of the slotted fastener conveyor;
    heating the head portion of the fastener being conveying along the perimeter of the slotted fastener conveyor;
    spraying a corrosion-resistant metal coating to the heated head portion of the fastener being conveying along the perimeter of the slotted fastener conveyor to coat the head portion with a sacrificial cathodic corrosion protection; and
    dislodging the fastener from the slotted fastener conveyor.

12. The method of claim 11, which includes holding the fastener to the slotted fastener conveyor via a magnetic force.

13. The method of claim 11, which includes blowing air at the head portion of the fastener before the fastener is heated.

14. The method of claim 11, wherein heating the head portion of the fastener being conveyed along the perimeter of the slotted fastener conveyor includes heating the head portion of the fastener with induction heating.

15. The method of claim 11, wherein heating the head portion of the fastener being conveyed along the perimeter of the slotted fastener conveyor includes heating the head portion of the fastener with open-flame heating.

16. The method of claim 11, wherein the corrosion-resistant coating is applied at a first angle, and which includes applying a second corrosion-resistant coating at a second angle to the head portion of the fastener being conveyed along the perimeter of the slotted fastener conveyor.

17. The method of claim 11, which includes blowing air across a shank portion of the fastener when the corrosion-resistant coating is applied.

18. The method of claim 11, which includes one of sand blasting, grit or bead blasting, and shot blasting the head portion of the fastener prior to heating and spraying the head portion of the fastener.

19. The method of claim 11, wherein the slotted fastener conveyor is rotatable, and which includes rotating the slotted fastener conveyor to convey the fastener along the perimeter of the slotted fastener conveyor.

20. The method of claim 11, which applying a sealer to the head portion of the fastener after spraying the heated head portion of the fastener with a molten or semi-molten metal.

21. The method of claim 20, which includes applying a top coat to the head portion of the fastener after applying a sealer to the head portion of the fastener.

\* \* \* \* \*